US012760226B2

(12) United States Patent
Kan et al.

(10) Patent No.: US 12,760,226 B2
(45) Date of Patent: Oct. 13, 2026

(54) MEMBRANE REACTOR

(71) Applicant: NGK Insulators, Ltd., Nagoya (JP)

(72) Inventors: Hirofumi Kan, Nagoya-City (JP); Atsushi Torii, Handa-City (JP); Kazuki Iida, Nagoya-City (JP)

(73) Assignee: NGK INSULATORS, LTD., Nagoya (JP)

( * ) Notice: Subject to any disclaimer, the term of this patent is extended or adjusted under 35 U.S.C. 154(b) by 826 days.

(21) Appl. No.: 18/174,757

(22) Filed: Feb. 27, 2023

(65) Prior Publication Data

US 2023/0220283 A1 Jul. 13, 2023

Related U.S. Application Data

(63) Continuation of application No. PCT/JP2022/023071, filed on Jun. 8, 2022.

(30) Foreign Application Priority Data

Jun. 8, 2021 (JP) ................................ 2021-095823

(51) Int. Cl.
*C10G 2/00* (2006.01)
*B01J 8/00* (2006.01)

(52) U.S. Cl.
CPC .............. *C10G 2/341* (2013.01); *B01J 8/009* (2013.01); *B01J 2208/00238* (2013.01); *B01J 2208/00884* (2013.01); *B01J 2208/021* (2013.01); *B01J 2208/023* (2013.01)

(58) Field of Classification Search
CPC ............ B01D 61/00–146; B01D 61/20; B01D 61/22; B01D 2315/00; B01D 2315/10; B01D 2315/16; C07K 1/00–36
See application file for complete search history.

(56) References Cited

U.S. PATENT DOCUMENTS

| | | | | |
|---|---|---|---|---|
| 5,674,301 | A | 10/1997 | Sakai et al. | |
| 5,958,091 | A | 9/1999 | Sakai et al. | |
| 6,440,895 | B1 | 8/2002 | Tonkovich et al. | |
| 10,150,721 | B2 * | 12/2018 | Klinghoffer | B01J 23/80 |
| 2008/0311014 | A1 | 12/2008 | Nakamura et al. | |

(Continued)

FOREIGN PATENT DOCUMENTS

| | | | |
|---|---|---|---|
| CA | 2186222 | A1 | 10/1995 |
| JP | H04-160003 | A | 6/1992 |

(Continued)

OTHER PUBLICATIONS

JP 2017149616 A with machine translation (Year: 2017).*

(Continued)

*Primary Examiner* — Natasha E Young
(74) *Attorney, Agent, or Firm* — Muncy, Geissler, Olds & Lowe, P.C.

(57) ABSTRACT

A membrane reactor includes a catalyst layer, a separation membrane, and a buffer layer. The catalyst layer contains a catalyst for promoting a conversion reaction from a feed gas containing hydrogen and carbon oxide to a liquid fuel. The separation membrane is permeable to water vapor which is a byproduct of the conversion reaction. The buffer layer is disposed between the separation membrane and the catalyst layer, and permeable to the water vapor toward the separation membrane.

10 Claims, 3 Drawing Sheets

(56) References Cited

U.S. PATENT DOCUMENTS

| | | | |
|---|---|---|---|
| 2017/0335203 | A1 | 11/2017 | Al-Shammari et al. |
| 2018/0016218 | A1 | 1/2018 | Klinghoffer et al. |

FOREIGN PATENT DOCUMENTS

| | | | |
|---|---|---|---|
| JP | H08-040703 | A | 2/1996 |
| JP | H09-511509 | A | 11/1997 |
| JP | 2003-520675 | A | 7/2003 |
| JP | 2005-314163 | A | 11/2005 |
| JP | 2007-055970 | A | 3/2007 |
| JP | 2007-269595 | A | 10/2007 |
| JP | 2011-116603 | A | 6/2011 |
| JP | 4938522 | B2 | 5/2012 |
| JP | 2017-149616 | A | 8/2017 |
| JP | 2018-008940 | A | 1/2018 |
| JP | 2018-505231 | A | 2/2018 |
| JP | 2019-156658 | A | 9/2019 |
| JP | 2020-024917 | A | 2/2020 |

OTHER PUBLICATIONS

English translation of the International Preliminary Report on Patentability (Chapter I) dated Dec. 21, 2023 (Application No. PCT/JP2022/023071).

M.R. Rahimpour et al., "*Palladium Membranes Application in Reaction Systems for Hydrogen Separation and Purification: A Review,*" Chemical Engineering and Processing: Process Intensification, vol. 21, Nov. 1, 2017 (Nov. 1, 2017), pp. 24-49.

Extended European Search Report dated Aug. 20, 2024 (Application No. 22820242.0).

Japanese Office Action (Application No. 2022-576843) dated Aug. 8, 2023 (with English translation) (9 pages).

International Search Report and Written Opinion (Application No. PCT/JP2022/023071) dated Aug. 16, 2022.

Japanese Office Action (Application No. 2022-576843) dated Dec. 19, 2023 (with English translation) (8 pages).

Chinese Office Action (with English translation) dated Jan. 22, 2026 (Application No. 202280006336.1).

* cited by examiner

MEMBRANE REACTOR

CROSS-REFERENCE TO RELATED APPLICATION

This is a continuation of PCT/JP2022/023071, now WO 2022/260063, filed Jun. 8, 2022, which claims priority from Japanese Application No. 2021-095823, filed Jun. 8, 2021 the entire contents of which are hereby incorporated by reference.

TECHNICAL FIELD

The present invention relates to a membrane reactor.

BACKGROUND ART

In recent years, membrane reactors have been developed that can improve conversion efficiency by separating water vapor, which is a byproduct, in a conversion reaction from a feed gas containing hydrogen and carbon oxide (carbon monoxide, carbon dioxide, etc.) to a liquid fuel (a fuel in a liquid state at room temperature and atmospheric pressure, such as methanol).

JP 2018-8940A discloses a membrane reactor equipped with a catalyst that promotes the conversion reaction from a feed gas containing carbon dioxide and hydrogen to methanol, and a separation membrane that is permeable to water vapor which is a byproduct of the conversion reaction.

SUMMARY

However, in the membrane reactor described in JP 2018-8940A, the catalyst is in direct contact with the separation membrane. Therefore, if the catalyst is heated by the reaction heat, cracks starting from a point of contact with the catalyst may occur in the separation membrane.

The present invention has been made in view of the foregoing situation, and aims to provide a membrane reactor capable of suppressing cracks in the separation membrane.

A membrane reactor according to the present invention includes a catalyst layer, a separation membrane, and a buffer layer. The catalyst layer contains a catalyst for promoting a conversion reaction from a feed gas containing hydrogen and carbon oxide to a liquid fuel. The separation membrane is permeable to water vapor which is a byproduct of the conversion reaction. The buffer layer is disposed between the separation membrane and the catalyst layer, and permeable to the water vapor toward the separation membrane.

According to the present invention, a membrane reactor capable of suppressing cracks in the separation membrane can be provided.

DESCRIPTION OF EMBODIMENTS

Next, an embodiment of the present invention will be described with reference to the drawings. However, the drawings are schematic, and the proportions and the like of each dimension may differ from the reality.

Membrane Reactor 1

Figure 1:
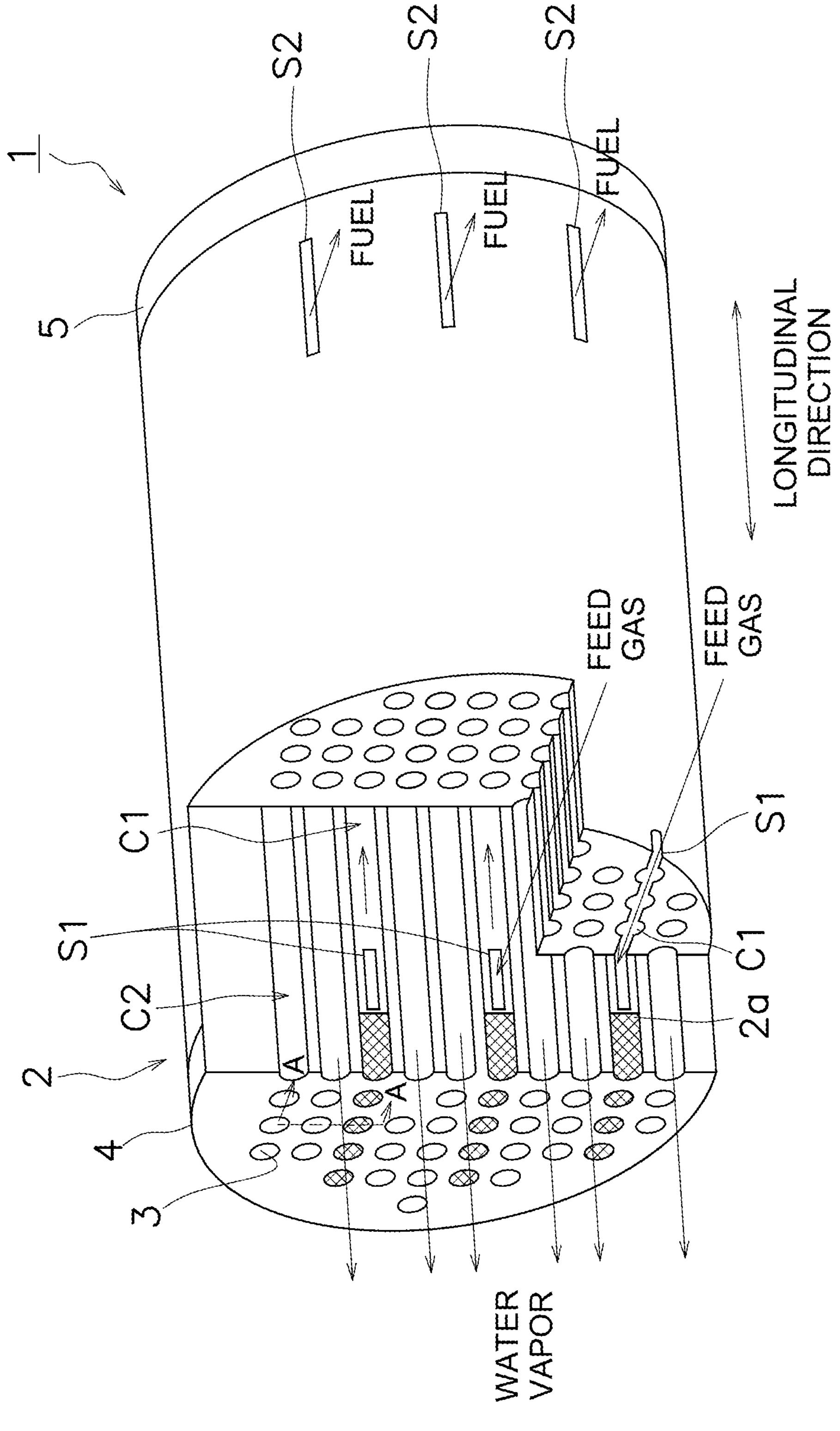
FIG. 1 is a perspective view of a membrane reactor.

FIG. 1 is a perspective view of a membrane reactor 1. FIG. 1 partially shows a cross-sectional structure of the membrane reactor 1.

The membrane reactor 1 is used to convert a feed gas to a liquid fuel. The feed gas contains hydrogen and carbon oxide. Examples of carbon oxide include carbon monoxide, carbon dioxide, and mixtures thereof. The liquid fuel may be any fuel in a liquid state at normal temperature and atmospheric pressure, such as methanol, ethanol, a liquid fuel represented by $C_nH_{2(m-2n)}$ (m and n are integers less than 30), and mixtures thereof.

For example, the reaction formulas for the synthesis of methanol by catalytic hydrogenation of feed gases containing carbon monoxide or carbon dioxide and hydrogen in the presence of a catalyst are as follows.

$$CO + 2H_2 \rightleftharpoons CH_3OH \quad (1)$$

$$CO + 3H_2 \rightleftharpoons CH_3OH + H_2O \quad (2)$$

$$CO + 2H_2 \rightleftharpoons CO + H_2O \quad (3)$$

All of the above reactions are equilibrium reactions, and it is preferable to react under high temperature and high pressure (e.g., 200° C. or higher and 2 MPa or higher) to increase both conversion and reaction rate. The liquid fuel is in a gaseous state when it is synthesized, and remains in a gaseous state at least until this liquid fuel flows out of the membrane reactor 1. It is preferable that the membrane reactor 1 has heat resistance and pressure resistance appropriate for the production conditions of the liquid fuel.

The membrane reactor 1 according to the present embodiment can further improve the conversion efficiency utilizing the equilibrium shift effect by separating water vapor, which is a byproduct of the conversion reaction from the feed gas to the liquid fuel. The reaction equilibria of the above equations (1) to (3) can be shifted to the product side by utilizing the equilibrium shift effect.

The membrane reactor 1 has a porous support 2, separation membranes 3, a first seal portion 4, and a second seal portion 5.

The porous support 2 has a monolithic shape extending in the longitudinal direction. The "monolithic shape" means a shape having a plurality of cells penetrating in the longitudinal direction, and is an idea that includes a honeycomb shape.

Although the porous support 2 in the present embodiment has a cylindrical shape, the shape of the porous support 2 is not specifically limited. The size of the porous support 2 is not specifically limited, but may have a length of 150 mm or more and 2000 mm or less and a width of 30 mm or more and 220 mm or less, for example.

The porous support 2 has three rows of non-permeate-side cells C1, seven rows of permeate-side cells C2, three supply slits S1, and three discharge slits S2 inside.

Both ends of each non-permeate-side cell C1 in the longitudinal direction are sealed by sealing portions 2*a*. Both ends of each permeate-side cell C2 in the longitudinal direction are open to the first seal portion 4 and the second seal portion 5.

Each supply slit S1 penetrates the non-permeate-side cells C1 in a corresponding row. The supply slits S1 are disposed on one end side of the porous support 2 in the longitudinal direction. Each discharge slit S2 penetrates the non-permeate-side cells C1 in a corresponding row. The discharge slits S2 are disposed on the other end side of the porous support 2 in the longitudinal direction.

A feed gas is supplied to the non-permeate-side cells C1 in each row via the corresponding supply slit S1. The feed gas supplied to the non-permeate-side cells C1 is converted to a liquid fuel by a catalyst contained in later-described catalyst layers 21. The generated liquid fuel is discharged from the non-permeate-side cells C1 in each row via the corresponding discharge slit S2.

The separation membranes 3 are formed on inner surfaces of the permeate-side cells C2. The separation membranes 3 is permeable to water vapor which is a byproduct of the conversion reaction. It is preferable that the separation membranes 3 have a water vapor permeability coefficient of 1000 nmol/(s·Pa·$m^2$) or more. The larger the water vapor permeability coefficient, more water vapor generated in the catalyst layers 21 can be moved to the permeate-side cells C2. Thus, the reaction equilibria of the above formulas (2) and (3) are shifted to the product side, and higher reaction efficiency can be achieved under milder production conditions. The water vapor permeability coefficient can be obtained by a known method (See Ind. Eng. Chem. Res., 40, 163-175 (2001)).

It is preferable that the separation membranes 3 is not permeable to any constituents other than water vapor (i.e., hydrogen, carbon oxide, and liquid fuel). Specifically, it is preferable that the separation membranes 3 have a separation coefficient of 1000 or more. The larger the separation coefficient is, the separation membranes 3 allow passage of more water vapor and less constituents other than water vapor. The separation coefficient can be obtained by a known method (see FIG. 1 in "Separation and Purification Technology 239 (2020) 116533").

The separation membranes 3 may be inorganic membranes. Inorganic membranes are preferable because of heat resistance, pressure resistance, and water vapor resistance. Examples of inorganic membranes include zeolite membranes, silica membranes, alumina membranes, and composite membranes thereof. Particularly, zeolite membranes with a molar ratio (Si/Al) of 50 or less between silicon element (Si) and aluminum element (Al) are favorable due to the excellent water vapor permeability thereof.

Water vapor that has passed through the separation membranes 3 and flowed into the permeate-side cells C2 is discharged from the openings in the first seal portion 4 and the second seal portion 5. Alternatively, water vapor may be discharged together with sweep gas from the openings in the second seal portion 5 by supplying the sweep gas from the openings in the first seal portion 4. The sweep gas may be, for example, nitrogen or air.

The first seal portion 4 and the second seal portion 5 cover the respective end faces of the porous support 2 so that water vapor discharged from the permeate-side cells C2 do not permeate the porous support 2. However, the first seal portion 4 and the second seal portion 5 do not cover both the two ends of the permeate-side cells C2. The first seal portion 4 and the second seal portion 5 may be made of glass, metal, rubber, resin, or the like.

Porous Base 2

Figure 2:
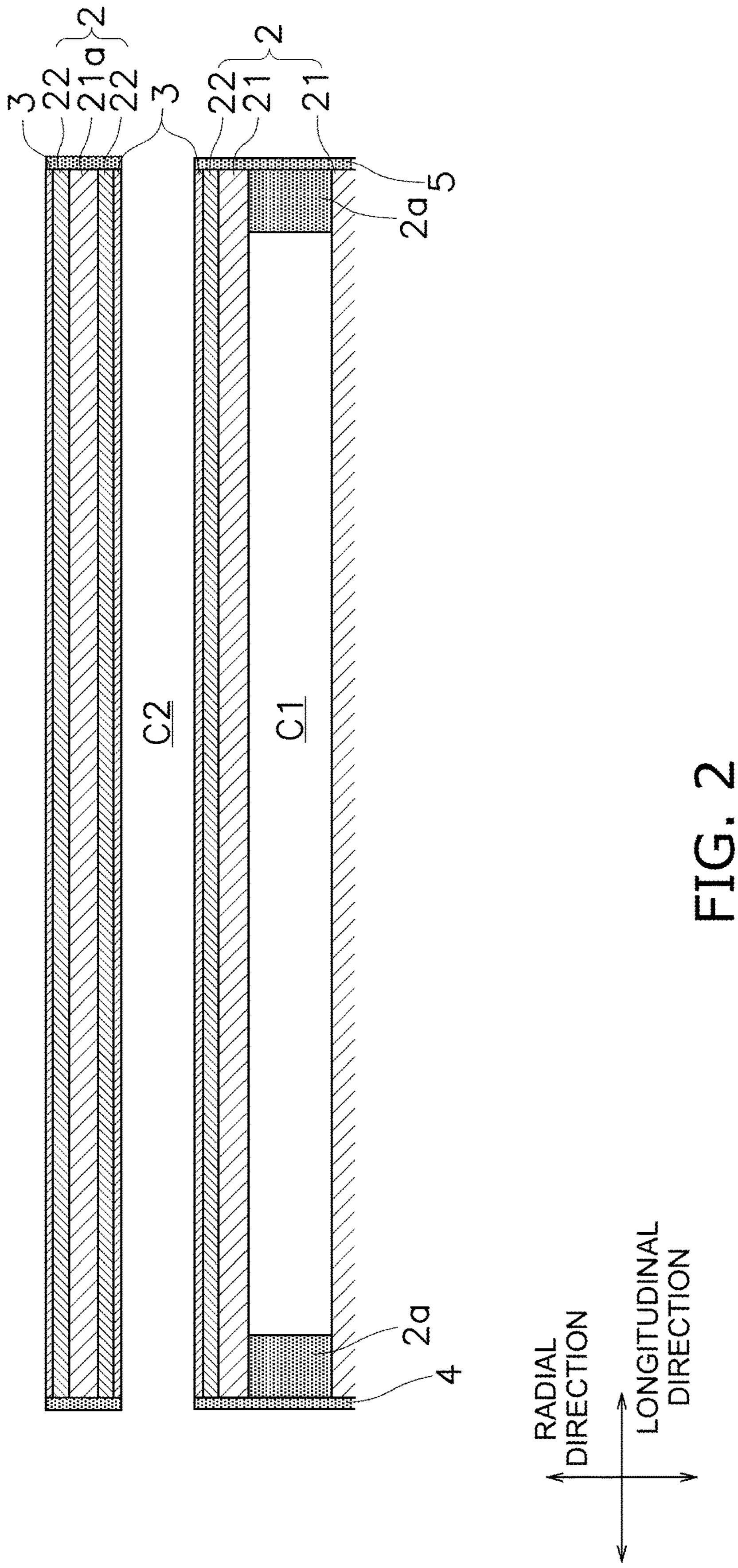
FIG. 2 is a cross-sectional view of FIG. 1 taken along the A-A line.

FIG. 2 is a cross-sectional view of FIG. 1 taken along the A-A line.

The porous support 2 supports the separation membranes 3. The porous support 2 has catalyst layers 21 and buffer layers 22. In the present embodiment, a catalyst layer 21 and a buffer layer 22 are disposed on the non-permeate side of each separation membrane 3.

Each catalyst layer 21 is a porous body constituted by a porous material and a catalyst that promotes the aforementioned conversion reaction.

The average pore diameter of the catalyst layers 21 can be 5 μm or more and 25 μm or less. The average pore diameter of the catalyst layers 21 can be measured by means of the mercury intrusion method. The porosity of the catalyst layers 21 can be 25% or more and 50% or less. The average particle size of the porous material that constitutes the catalyst layers 21 can be 1 μm or more and 100 μm or less. In the present embodiment, the average particle size refers to the arithmetic mean of the largest diameters of 30 particles to be measured (randomly selected), as measured by cross-sectional microstructural observation using a scanning electron microscope (SEM).

A ceramic material, a metallic material, a resin material, or the like can be used as the porous material, and a ceramic material is particularly favorable. Alumina ($Al_2O_3$), titania ($TiO_2$), mullite ($Al_2O_3$·SiO2), potsherd, cordierite ($Mg_2Al_4Si_5O_{18}$), or the like can be used as an aggregate for the ceramic material. Alumina is favorable, considering availability, bowl stability and corrosion resistance. At least one of titania, mullite, sinterable alumina, silica, glass frit, a clay mineral, or easy-sintering cordierite can be used as an inorganic binder for the ceramic material. However, the ceramic material need not necessarily contain an inorganic binder.

The catalyst promotes the conversion reaction from the feed gas to the liquid fuel. The catalyst is disposed in the pores of the porous material. The catalyst may be carried on the inner surfaces of the pores. Alternatively, a carrier for carrying the catalyst may be attached to the inner surfaces of the pores.

The catalyst may be a known catalyst suitable for the conversion reaction to a desired liquid fuel. Specifically, any of metal catalysts (copper, palladium, etc.), oxide catalysts (zinc oxide, zirconia, gallium oxide, etc.), and composite catalysts (copper-zinc oxide, copper-zinc oxide-alumina, copper-zinc oxide-chrome oxide-alumina, copper-cobalt-titania, and these catalysts modified with palladium, etc.) can be used.

Each catalyst layer 21 is disposed between a non-permeate-side cell C1 and a permeate-side cell C2. Meanwhile, a support layer 21*a* is disposed between two permeate-side cells C2. The support layer 21*a* has a configuration corresponding to a catalyst layer 21 from which the catalyst is removed.

Each buffer layer 22 is disposed between a separation membrane 3 and a catalyst layer 21. The buffer layers 22 are provided in order not to bring the catalyst contained in the catalyst layers 21 into direct contact with the separation membranes 3. Physically separating the catalyst from the separation membranes 3 by means of the buffer layers 22 can prevent cracks originating from contact points with the catalyst from occurring in the separation membranes 3 even if the catalyst is heated by the reaction heat.

The buffer layers 22 may be interposed, at least partially, between the separation membranes 3 and the catalyst layers 21, but it is preferable that the buffer layers 22 are interposed substantially entirely between the separation membranes 3 and the catalyst layers 21.

The buffer layers 22 are disposed on the inner surfaces of the catalyst layers 21. Each buffer layer 22 has a cylindrical shape. The buffer layers 22 also function as carriers (base layers) of the separation membranes 3.

The buffer layers 22 can be made of the same porous material as the catalyst layers 21. Particularly, a ceramic material is favorably used. It is preferable to use at least either alumina or titania as the aggregate of the ceramic material. The buffer layers 22 may also contain the same inorganic binder as that of the catalyst layers 21.

The average pore diameter of the buffer layers 22 is preferably smaller than the average pore diameter of the catalyst layers 21, and can be, for example, 0.001 μm or more and 2 μm or less. The average pore diameter of the buffer layers 22 can be measured by a perm-porometer. The porosity of the buffer layers 22 can be 20% or more and 60% or less. The average particle size of the porous material that constitutes the buffer layers 22 is preferably smaller than the average particle size of the porous material that constitutes the catalyst layers 21, and can be, for example, 0.01 μm or more and 20 μm or less.

Production Method of Membrane Reactor 1

First, the porous material used for the catalyst layer 21 is molded by means of extrusion molding, press molding, casting molding, or the like, to form a monolith-shaped porous compact.

Next, slits for the supply slits S1 and the discharge slits S2 are formed in respective end faces of the porous compact using a diamond cutting tool (band saw, disk cutter, wire saw, etc.).

Next, compacts of the sealing portions 2*a* are formed by filling the formed slits with the porous material, and then the porous compact is fired (e.g., 500° C. to 1500° C., 0.5 hours to 80 hours) to form a porous body.

Next, a slurry for the buffer layer is prepared by adding a sintering aid, a pH adjuster, a surfactant, and the like to the porous material for the buffer layer 22.

Next, a compact of the buffer layer 22 is formed on an inner surface of an open hole in the porous material by means of a filtration method while distributing the slurry for the buffer layer through the open hole.

Next, the buffer layer 22 is formed by firing (e.g., 500° C. to 1450° C., 0.5 hours to 80 hours) the compacts of the buffer layers 22.

Next, a glass raw material slurry, for example, is applied to both end faces of the porous body and fired (e.g., 800-1000° C.) to form the first seal portion 4 and the second seal portion 5.

Next, a catalyst-containing slurry that is a mixture of the catalyst for the catalyst layer 21 and an organic solvent is prepared, and the inner surface of the non-permeate-side cell C1 are impregnated with the catalyst-containing slurry by means of a filtration method while supplying the catalyst-containing slurry from the supply slit S1. Here, the impregnation depth of the catalyst-containing slurry is controlled by adjusting the viscosity by PVA or the like so that the catalyst-containing slurry is not impregnated up to the buffer layer 22.

Next, the catalyst is loaded onto the porous material by performing heat treatment (e.g., 50° C. to 200° C., 0.5 hours to 80 hours in an $N_2$ air stream) on the porous body in an inert atmosphere. The catalyst layer 21 is thus formed.

Next, the separation membrane 3 is formed on the inner surface of the buffer layer 22. Any method suitable for the type of separation membrane 3 may be employed, as appropriate, as the formation method of the separation membrane 3. For example, the production method described in JP 2004-66188A can be employed if a zeolite membrane is used as the separation membrane 3, and the production method described in WO2008/050812 can be employed if a silica membrane is used as the separation membrane 3.

OTHER EMBODIMENTS

Although an embodiment of the present invention has been described above, the present invention is not limited to the above embodiment and can be changed in various manners without departing from the gist of the invention.

Variation 1

In the above embodiment, the catalyst layer 21 and the buffer layer 22 come into direct contact with each other. However, one or more intermediate layers may be interposed between the catalyst layer 21 and the adjacent buffer layer 22.

The intermediate layer is made of a porous material that can be used in the catalyst layer 21. The average pore diameter of the intermediate layer is preferably smaller than the average pore diameter of the catalyst layer 21, and can be, for example, 0.005 μm or more and 5 μm or less. The average pore diameter of the intermediate layer can be measured by a perm-porometer. The porosity of the intermediate layer can be, for example, 20% or more and 60% or less. The thickness of the intermediate layer can be, for example, 1 μm or more and 300 μm or less.

Variation 2

The above embodiment has described the case where the membrane reactor 1 has a monolithic shape, but the shape of the membrane reactor 1 may alternatively be, for example, a flat plate shape, a tubular shape, a cylindrical shape, a circular column shape, a polygonal column shape, or the like.

Variation 3

Although the above embodiment has described a configuration in which the porous support 2 is disposed on the non-permeate side of the separation membrane 3, but this configuration is not limiting.

Figure 3:
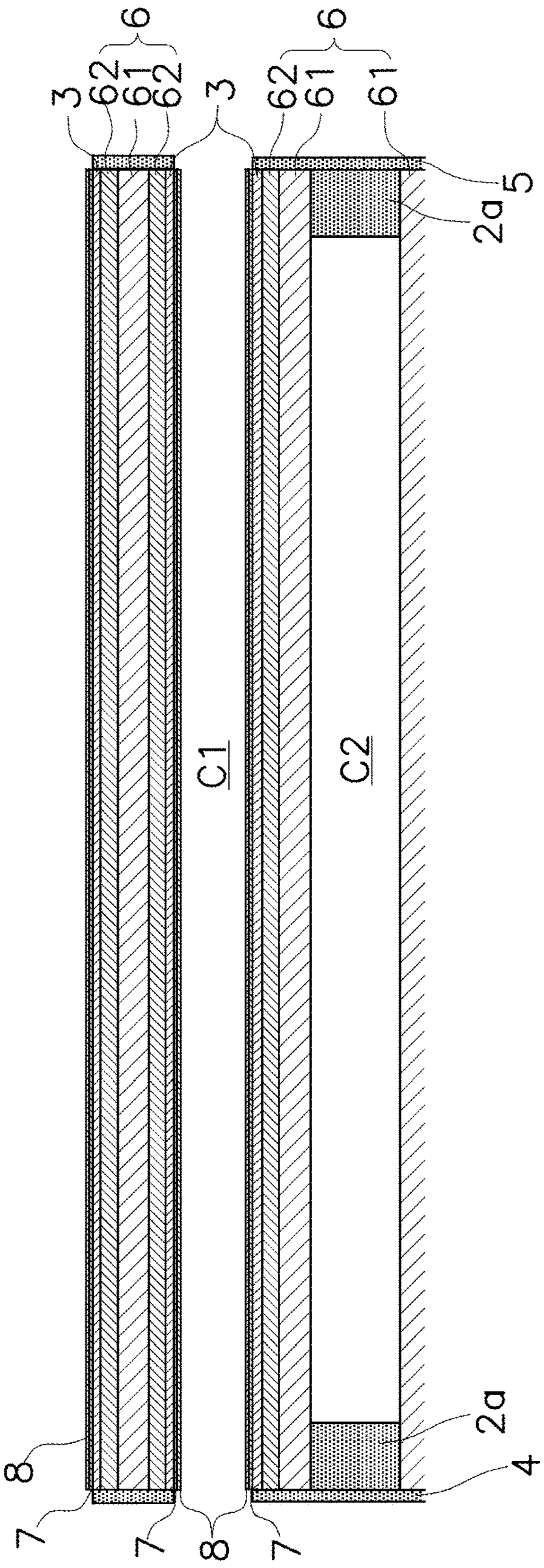
FIG. 3 is a cross-sectional view of a membrane reactor according to a variation 3.
Figure 3:
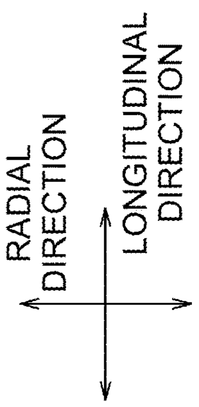

For example, a configuration may alternatively be employed in which, as shown in FIG. 3, a porous support 6 is disposed on the permeate side of each separation membrane 3, and a buffer layer 7 and a catalyst layer 8 are disposed on the non-permeate side of each separation membranes 3.

In the configuration shown in FIG. 3, the inside of the catalyst layers 8 serves as the non-permeate-side cell C1, and the inside of the porous support 6 serves as the permeate-side cells C2. A raw material supplied to the non-permeate-side cells C1 is converted to a liquid fuel in the catalyst layers 8, and water vapor, which is a byproduct, is generated. The generated water vapor passes through the separation membranes 3, flows into the permeate-side cells C2, and is discharged from the slits S1 and S2. Thus, the flow of water vapor in this variation is opposite to the flow of water vapor in the above embodiment.

The porous support 6 has support layers 61 and surface layers 62. The support layers 61 have a configuration corresponding to the catalyst layers 21 according to the above embodiment from which the catalyst is removed. The surface layers 62 have the same configuration as the buffer layers 22 according to the above embodiment.

Each buffer layer 7 is disposed between a catalyst layer 8 and a separation membrane 3. The buffer layers 7 are provided in order not to bring the catalyst contained in the catalyst layers 8 into direct contact with the separation membranes 3. Physically separating the catalyst from the separation membranes 3 using the buffer layers 7 can prevent cracks originating from contact points with the catalyst from occurring in the separation membranes 3 even if the catalyst is heated by the reaction heat.

The buffer layers 7 can be made of a ceramic material or an organic polymeric material. Silica, alumina, chromia, or the like can be used as the ceramic material. PTFE, PVA, PEG, or the like can be used as the organic polymeric material.

Each buffer layer 7 has a contact surface (not shown) in contact with a catalyst layer 8. It is preferable that the surface roughness Ra of the contact surface is twice or more the average particle size of the catalyst. This can improve the adhesion between the catalyst layer 8 and the buffer layer 7. The average particle size of the catalyst is the arithmetic mean of the largest diameters of 30 catalyst particles (randomly selected), as measured by microstructural observation using a SEM. The value of the surface roughness Ra of the contact surface is not specifically limited, but preferably 1 μm or more and 20 μm or less. A surface roughness Ra of 1 μm or more can prevent the catalyst contained in the catalyst layer 8 from detaching from the buffer layer 7. A surface roughness Ra of 20 μm or less can suppress deterioration of performance of the membrane reactor.

The catalyst layers 8 contain the constituent material (ceramic material or organic polymeric material) of the buffer layers 7, and a catalyst that promotes the conversion reaction. The catalyst layers 8 containing the constituent material of the buffer layers 7 can improve the adhesion between the catalyst layers 8 and the buffer layers 7. However, the catalyst layers 8 need not necessarily contain the constituent material of the buffer layers 7. In this case, the catalyst layers 8 are constituted solely by the catalyst.

The catalyst contained in the catalyst layers 8 can be the same as the catalyst contained in the catalyst layers 21 according to the above-described embodiment.

The configuration shown in FIG. 3 is produced by forming up to the separation membrane 3 in accordance with the production method described in the above embodiment (excluding the process of impregnation with the catalyst-containing slurry) and then sequentially forming the buffer layer 7 and the catalyst layer 8 on the inner surface of the separation membrane 3.

The buffer layer 7 can be formed by distributing a slurry for the buffer layer that is a mixture of a ceramic material or an organic polymeric material with an organic solvent to the inside of the separation membrane 3, and then applying a heat treatment.

The catalyst layer 8 can be formed by distributing a slurry for the catalyst layer that is a mixture of the constituent material (ceramic material or organic polymeric material) of the buffer layer 7, the catalyst, and an organic solvent to the inside of the buffer layer 7, and then applying a heat treatment under an inert atmosphere.

Variation 4

In the above embodiment, the separation membrane 3 is permeable to water vapor which is a byproduct of the conversion reaction from a feed gas to a liquid fuel. However, this configuration is not limiting. The separation membrane 3 may be permeable to the liquid fuel itself which is the product of the conversion reaction from a feed gas to the liquid fuel. In this case as well, the reaction equilibria of the above formulas (1) and (2) can be shifted to the product side.

In the case where the separation membrane 3 is permeable to the liquid fuel, the reaction equilibria can also be shifted to the product side even when the liquid fuel is generated by a reaction in which water vapor is not generated as a byproduct (e.g., see the above formula (1)).

REFERENCE SIGNS LIST

1 Membrane reactor
2 Porous base
21 Catalyst layer
22 Buffer layer
3 Separation membrane
4 First seal portion
5 Second seal portion
6 Porous base
61 Support layer
62 Surface layer
7 Buffer layer
8 Catalyst layer
C1 Non-permeate-side cell
C2 Permeate-side cell
S1 Supply slit
S2 Discharge slit

The invention claimed is:

1. A membrane reactor comprising:
a catalyst layer containing a catalyst for promoting a conversion reaction from a feed gas containing hydrogen and carbon oxide to a liquid fuel;
a separation membrane being permeable to water vapor which is a byproduct of the conversion reaction; and
a buffer layer being permeable to the water vapor toward the separation membrane, the buffer layer being disposed between the separation membrane and the catalyst layer;
wherein the buffer layer and the catalyst layer are disposed on a non-permeate side of the separation membrane, and constitute a porous support for supporting the separation membrane.

2. The membrane reactor according to claim 1, wherein
the catalyst layer includes the catalyst and a porous material, and
the buffer layer includes a porous material.

3. A membrane reactor comprising:
a catalyst layer containing a catalyst for promoting a conversion reaction from a feed gas containing hydrogen and carbon oxide to a liquid fuel;
a separation membrane being permeable to water vapor which is a byproduct of the conversion reaction:
a buffer layer being permeable to the water vapor toward the separation membrane, the buffer layer being disposed between the separation membrane and the catalyst layer; and
a porous support for supporting the separation membrane, the porous support being disposed on a permeate side of the separation membrane.

4. The membrane reactor according to claim 3, wherein
the catalyst layer includes the catalyst and a constituent material of the buffer layer.

5. The membrane reactor according to claim 2, wherein
the buffer layer has a contact surface in contact with the catalyst layer, and
the contact surface has a surface roughness Ra of at least 1 μm.

6. A membrane reactor comprising:

a catalyst layer containing a catalyst for promoting a conversion reaction from a feed gas containing hydrogen and carbon oxide to a liquid fuel;

a separation membrane being permeable to the liquid fuel; and a buffer layer being permeable to the liquid fuel toward the separation membrane, the buffer layer being disposed between the separation membrane and the catalyst layer;

wherein the buffer layer and the catalyst layer are disposed on a non-permeate side of the separation membrane, and constitute a porous support for supporting the separation membrane.

7. The membrane reactor according to claim 6, wherein the catalyst layer includes the catalyst and a porous material, and the buffer layer includes a porous material.

8. A membrane reactor comprising:

a catalyst layer containing a catalyst for promoting a conversion reaction from a feed gas containing hydrogen and carbon oxide to a liquid fuel;

a separation membrane being permeable to the liquid fuel:

a buffer layer being permeable to the liquid fuel toward the separation membrane, the buffer layer being disposed between the separation membrane and the catalyst layer; and a porous support for supporting the separation membrane, the porous support being disposed on a permeate side of the separation membrane.

9. The membrane reactor according to claim 8, wherein the catalyst layer includes the catalyst and a constituent material of the buffer layer.

10. The membrane reactor according to claim 7, wherein the buffer layer has a contact surface in contact with the catalyst layer, and the contact surface has a surface roughness Ra of at least 1 μm.

* * * * *